United States Patent

Wu

Patent Number: 5,694,726
Date of Patent: Dec. 9, 1997

[54] PLASTIC FITTING ASSEMBLY

[76] Inventor: Ming-Hsin Wu, 20, Lane 92, Shing Ell St., Tao Yuan City, Tao Yuan County, Taiwan

[21] Appl. No.: 561,974

[22] Filed: Nov. 22, 1995

[51] Int. Cl.[6] ........................................ E04B 1/343
[52] U.S. Cl. .................. 52/287.1; 52/288.1; 52/717.03; 52/717.05; 52/718.01; 52/718.04; 52/718.06; 174/48
[58] Field of Search ............... 52/287.1, 288.1, 52/718.04, 718.06, 717.03, 717.05, 718.01; 174/48

[56] References Cited

U.S. PATENT DOCUMENTS

| | | | |
|---|---|---|---|
| 4,691,392 | 9/1987 | Whitney | 4/595 |
| 5,024,614 | 6/1991 | Dola et al. | 52/288.1 X |
| 5,243,800 | 9/1993 | Olbrich | 52/287.1 |
| 5,274,972 | 1/1994 | Hansen | 52/287.1 X |
| 5,336,849 | 8/1994 | Whitney | 52/287.1 X |

FOREIGN PATENT DOCUMENTS 1574827  9/1980  United Kingdom ............ 52/287.1

*Primary Examiner*—Christopher Todd Kent
*Attorney, Agent, or Firm*—Bacon & Thomas

[57] ABSTRACT

A plastic plate assembly used in fitting includes a flat and linear retainer plate and a casing having curved surfaces. The retainer plate has an L-shaped retaining strip bending inwardly from either lateral side thereof. Correspondingly, the casing has an L-shaped retaining strip bending outwardly from either lateral side thereof for fitting onto the L-shaped retaining strip. The casing further has one of the lateral sides extending to form a soft extension strip at an end portion thereof. The retainer plate is mounted on the wall first and the casing is secured thereto by means of its L-shaped retaining strips fitting into the L-shaped retaining strips of the retainer plate, with the soft extension strip lying close against the wall to conceal any gaps between the casing and the wall.

1 Claim, 2 Drawing Sheets

PLASTIC FITTING ASSEMBLY

BACKGROUND OF THE INVENTION (a) Field of the Invention

The present invention relates generally to plates used in fitting, and more particularly to a plastic plate assembly used in a fitting which is easy to install and which is capable of concealing any gaps.

(b) Description of the Prior Art

Conventional fitting plates are largely made of solid wood configured to have desired curved surfaces. Solid foam plastic materials are also used. However, in actual mounting, since the plates are nailed to the wall from the outside, the nails will be exposed on the plates, impairing the overall outlook of the plates. In addition, since the plates themselves are shaped to have right angles at their ends, there are inevitably gaps or crevices between the plates and the wall surfaces. It is therefore necessary to fill the gaps and perform any supplemental painting, which is indeed very inconvenient. Furthermore, due to the natural color of the wooden fitting plates, it may be necessary to re-paint the entire wall after the fitting plates are mounted in order to match the wood color.

SUMMARY OF THE INVENTION

A primary object of the present invention is to provide a plastic plate assembly used in fitting in which, after a retainer plate is nailed to the wall, a casing is fitted easily by means of corresponding L-shaped retaining strips provided at both lateral sides of the retainer plate and the casing such that the nails on the retainer plate may be hidden from sight.

Another object of the present invention is to provide a plastic plate assembly used in fitting, in which a soft extension strip is provided at a lateral end portion of a casing for concealing any gaps between the casing and the wall surface.

A further object of the present invention is to provide a plastic plate assembly used in fitting, in which a space is formed between a retainer plate and a casing for accommodating wires.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
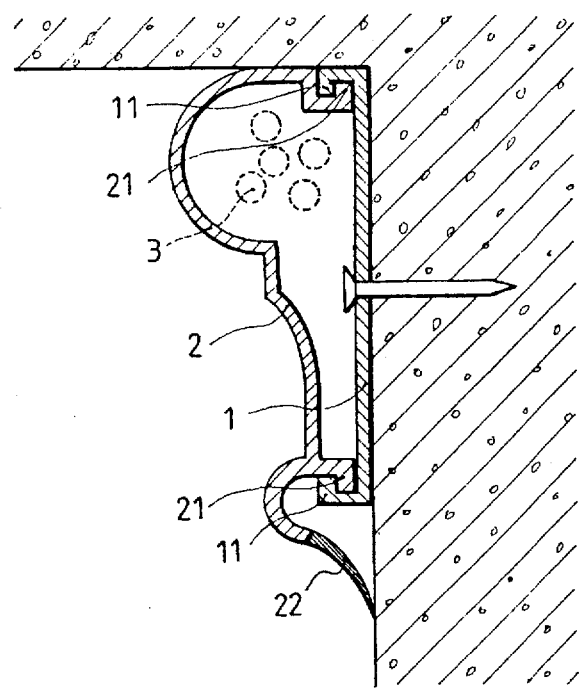
FIG. 1 is a sectional view of the present invention after it is mounted on the wall.
Figure 2:
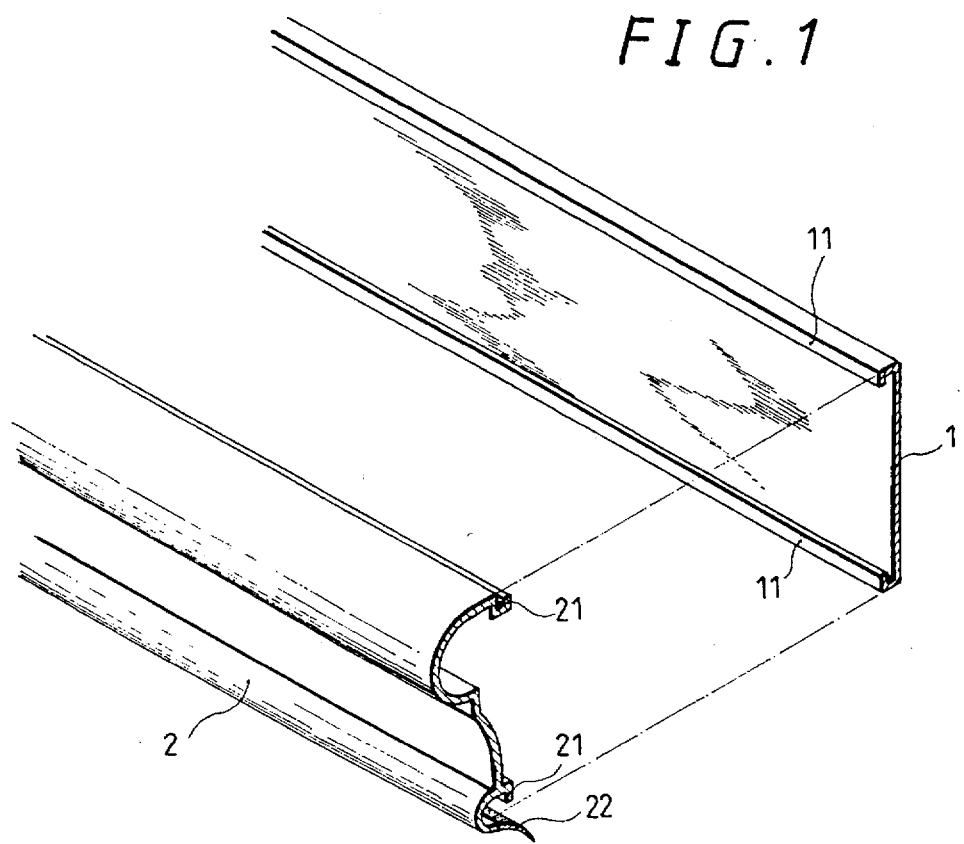
FIG. 2 is an exploded perspective view of the present invention.

With reference to the drawings, the plastic plate assembly used in fitting according to the present invention comprises a retainer plate 1 and a casing 2, both of which are elongate strip-like structures. The retainer plate 1 is a flat, linear plate having an L-shaped retaining strip 11 which bends inwardly from either lateral side thereof. The casing 2 is configured to have at least a curved surface and also has an L-shaped retaining strip 21 which bends outwardly from either lateral side thereof for matching and engaging with the L-shaped retaining strip 11 of the retainer plate 1. One of the lateral sides of the casing 2 further extends to form a soft extension strip 22 at an end portion thereof.

The retainer plate 1 and the casing 2, as mentioned above, are strip-like structures and may be cut to a suitable length as required. The casing 2 may be cut at 45 degrees so that it may join another casing 2 upon mounting. In assembling, the retainer plate 1 is firstly nailed to the wall along the lower rim of the ceiling. The L-shaped retaining strips 21 of the casing 2 are then fitted onto the L-shaped retaining strips 11 of the retainer plate 1 so that the retainer plate 1 and the casing 2 may be positioned and firmly secured in place. In addition, the soft extension strip 22 will just lie close against the wall to fit the contour of the wall surface and conceal any gaps between the casing 2 and the wall surface.

Figures 3, 3A:
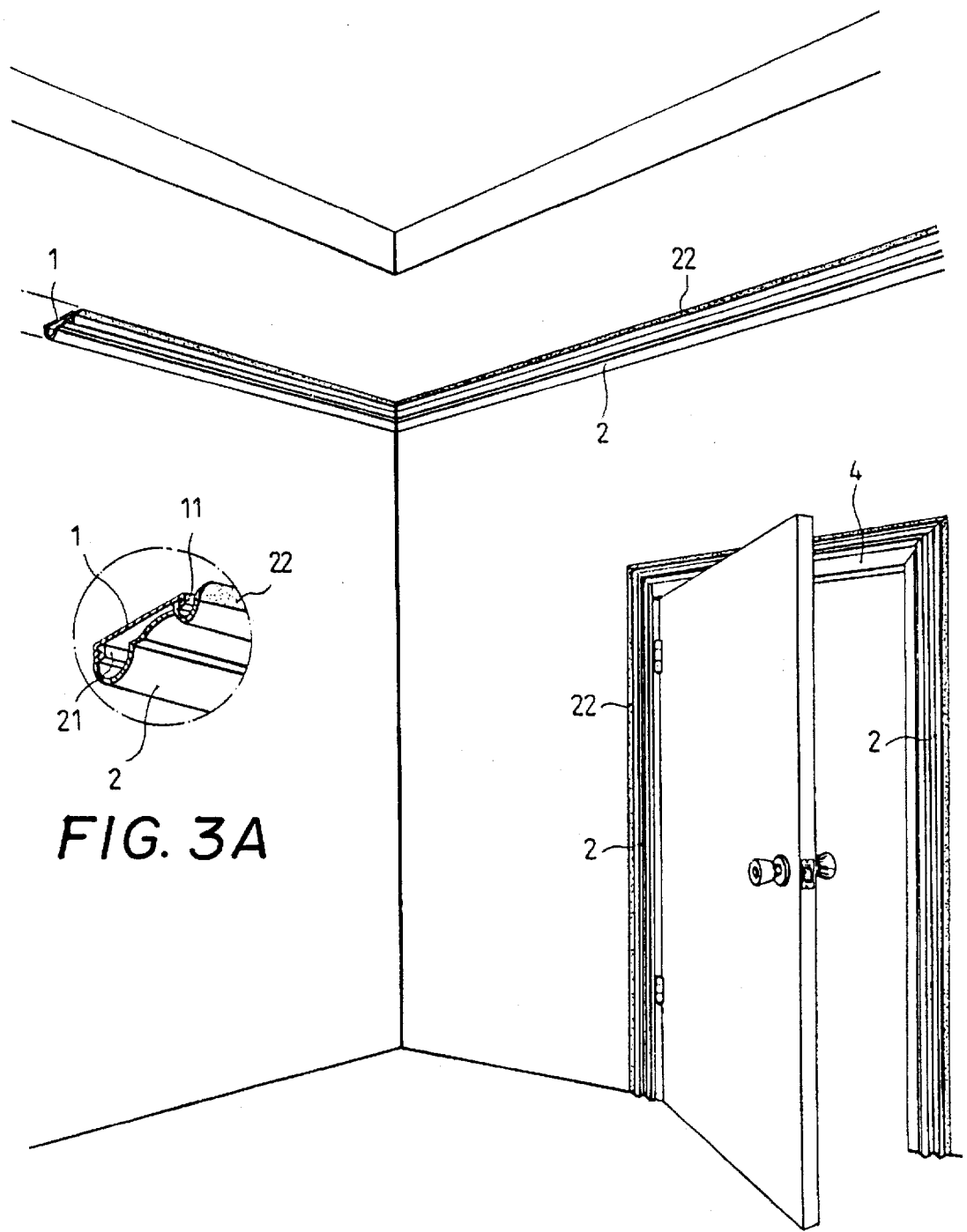
FIGS. 3 and 3A the present invention mounted on the walls and on a door frame.

Furthermore, there is a hollow space defined between the casing 2 and the retainer plate 1. The hollow space may be used to contain wires 3 so as to conceal the wires 3 and preventing them from marring the surface of the wall. The plastic plate assembly according to the present invention may be used in conjunction with a conventional door frame 4 (as shown in FIG. 3) so as to enhance the appearance of the door. By means of such an arrangement, the soft extension strip 22 of the casing 2 may fit the wall surface to hide any crevices or gaps between the door frame 4 and the wall, thus eliminating the need of filling the gaps or supplemental painting. The plastic plate assembly of the present invention is therefore convenient to install. In addition, the plastic plates may be designed to have various colors to provide more options and to eliminate the need of painting.

Although the present invention has been illustrated and described with reference to the preferred embodiment thereof, it should be understood that it is in no way limited to the details of such embodiment but is capable of numerous modifications within the scope of the appended claims.

What is claimed is:

1. A plastic fitting and corner assembly comprising:

a) a corner defined by a ceiling surface and a wall surface;

b) an elongate flat retainer plate attached to the corner, the retainer plate including a pair of first and second longitudinal sides having a pair of respective first and second inwardly directed L-shaped retaining strips, the second inwardly directed L-shaped retaining strip being disposed in the corner;

c) an elongate casing including a pair of first and second longitudinal sides having a pair of respective first and second outwardly directed L-shaped retaining strips, and an outwardly curved wall portion;

d) the first and second retaining strips of the retainer plate being engageable with the first and second retaining strips of the casing for securing the casing to the retainer plate and defining a longitudinal hollow space between the outwardly curved wall portion of the casing and the retainer plate for concealing wires therein;

e) the first side of the casing further terminating in a longitudinally extending strip engaging the wall surface and concealing the engagement between the first retaining strip of the retainer plate and the first retaining strip of the casing; and f) the second side of the casing and the second inwardly directed L-shaped retaining strip having a collective exterior configuration conforming to the corner.

* * * * *